US012691581B2

(12) United States Patent
Brönmark et al.

(10) Patent No.: US 12,691,581 B2
(45) Date of Patent: Jul. 28, 2026

(54) METHOD OF HANDLING SAFETY OF INDUSTRIAL ROBOT, CONTROL SYSTEM AND ROBOT SYSTEM

(71) Applicant: ABB Schweiz AG, Baden (CH)

(72) Inventors: Jonas Brönmark, Västerås (SE); Björn Löfvendahl, Västerås (SE); Stefan Romberg, Västerås (SE); Simon Gräsberg, Västerås (SE)

(73) Assignee: ABB Schweiz AG, Baden (CH)

( * ) Notice: Subject to any disclaimer, the term of this patent is extended or adjusted under 35 U.S.C. 154(b) by 114 days.

(21) Appl. No.: 18/699,703

(22) PCT Filed: Oct. 19, 2021

(86) PCT No.: PCT/EP2021/078907
§ 371 (c)(1),
(2) Date: Apr. 9, 2024

(87) PCT Pub. No.: WO2023/066460
PCT Pub. Date: Apr. 27, 2023

(65) Prior Publication Data
US 2024/0408760 A1 Dec. 12, 2024

(51) Int. Cl.
*B25J 9/16* (2006.01)
(52) U.S. Cl.
CPC .................................. *B25J 9/1676* (2013.01)
(58) Field of Classification Search
CPC ......... B25J 9/1676; G05B 2219/39443; G05B 2219/40196; G05B 2219/49137
See application file for complete search history.

(56) References Cited

U.S. PATENT DOCUMENTS

| | | | | |
|---|---|---|---|---|
| 9,802,317 B1 * | 10/2017 | Watts | ................... | G05B 19/402 |
| 2016/0016315 A1 | 1/2016 | Kuffner, Jr. et al. | | |
| 2016/0176054 A1 | 6/2016 | Foerster et al. | | |
| 2016/0207198 A1 * | 7/2016 | Willför | ................. | B25J 9/1676 |

(Continued)

FOREIGN PATENT DOCUMENTS

| | | |
|---|---|---|
| EP | 2380709 A2 | 10/2011 |
| EP | 2380709 A3 | 6/2013 |

OTHER PUBLICATIONS

International Search Report and Written Opinion of the International Searching Authority; Application No. PCT/EP2021/078907; Completed: Jun. 16, 2022; Mailing Date: Jun. 27, 2022; 14 Pages.

(Continued)

*Primary Examiner* — Khoi H Tran
*Assistant Examiner* — Tien Minh Le
(74) *Attorney, Agent, or Firm* — Whitmyer IP Group LLC

(57) ABSTRACT

A method of handling safety of an industrial robot of a robot system, the method including providing at least one virtual safety border defined in relation to the industrial robot, where each virtual safety border is associated with a condition to be fulfilled by the industrial robot; for each virtual safety border, performing an indication operation by the robot system, where the indication operation indicates a position of the virtual safety border in a physical workspace of the industrial robot; and for each indication operation, receiving a verification input from a user. A control system and a robot system are also provided.

21 Claims, 11 Drawing Sheets

(56) References Cited

U.S. PATENT DOCUMENTS

| | | | |
|---|---|---|---|
| 2021/0053227 A1* | 2/2021 | Wartenberg | B25J 19/06 |
| 2021/0086359 A1 | 3/2021 | Eberst et al. | |
| 2021/0107156 A1 | 4/2021 | Park et al. | |

OTHER PUBLICATIONS

International Preliminary Report on Patentability; Application No. PCT/EP2021/078907; Issued: Apr. 23, 2024; 8 Pages.

* cited by examiner

METHOD OF HANDLING SAFETY OF INDUSTRIAL ROBOT, CONTROL SYSTEM AND ROBOT SYSTEM

TECHNICAL FIELD

The present disclosure generally relates to safety in a physical workspace containing an industrial robot. In particular, a method of handling safety of an industrial robot of a robot system, a control system for handling safety of an industrial robot of a robot system, and a robot system comprising an industrial robot and a control system, are provided.

BACKGROUND

A robot system may comprise one or several industrial robots operating in a workspace. In some robot systems, the workspace is enclosed by a physical fence, for example to protect humans from the industrial robot.

As an alternative to a physical fence, some robot systems employ virtual safety borders to provide a safety configuration. Each virtual safety border is typically associated with a condition, for example that the industrial robot must not pass the virtual safety border. In this case, the robot system may also comprise a monitoring system supervising positions and movements of the industrial robot with respect to the virtual safety borders. If the safety configuration is violated by the industrial robot, the monitoring system can automatically stop the industrial robot to avoid an accident.

US2016207198 A1 discloses a method for verifying one or more safety volumes for a movable mechanical unit positioned in an environment, wherein a world-coordinate system is defined in relation to the mechanical unit and in relation to the environment of the mechanical unit. The method includes storing a description of one or more safety volumes defined in relation to the world-coordinate system, and repeatedly: determining position and orientation of a portable display unit in relation to the world-coordinate system; determining a graphical representation of the safety volumes based on the description of the safety volumes and the position and orientation of the portable display unit; overlaying the graphical representation of the safety volumes on a view of the real mechanical unit and its environment to provide a composited augmented reality image; and displaying the augmented reality image on the portable display unit.

A safety configuration comprising virtual safety borders may be generated and visualized in a virtual workspace. In the physical workspace however, the virtual safety borders are invisible to a human. It is therefore often challenging to verify whether the virtual safety borders have been correctly positioned, e.g. to prevent collisions between the industrial robot and any obstacles in the workspace. Examples of such obstacles comprise fences, equipment, and humans.

Virtual safety borders generated in a virtual environment may not always be positioned as expected in a physical workspace. The reasons for this may be many, for example that the workspace and any obstacles therein are not modelled accurately enough. If the industrial robot starts operating based on a virtual workspace that does not correspond to the real workspace, severe accidents may occur. For this reason, the safety configuration is typically verified by an integrator before the intended operations of the industrial robot are initiated. The verification of the safety configuration when setting up an automation cell comprising the industrial robot is however a very time-consuming step.

Thus, although designing a safety configuration in a virtual environment may be made rather quickly, the verification that the virtual design correctly matches the real design is very time consuming and consequently costly.

SUMMARY

One object of the present disclosure is to provide an improved method of handling safety of an industrial robot.

A further object of the present disclosure is to provide a method of handling safety of an industrial robot, which method enables an efficient verification of a position of a virtual safety border in a physical workspace.

A still further object of the present disclosure is to provide a method of handling safety of an industrial robot, which method enables an intuitive verification of a position of a virtual safety border in a physical workspace.

A still further object of the present disclosure is to provide a method of handling safety of an industrial robot, which method is cost-efficient.

A still further object of the present disclosure is to provide a method of handling safety of an industrial robot, which method is less complicated.

A still further object of the present disclosure is to provide a method of handling safety of an industrial robot, which method solves several or all of the foregoing objects in combination.

A still further object of the present disclosure is to provide a control system for handling safety of an industrial robot, which control system solves one, several or all of the foregoing objects.

A still further object of the present disclosure is to provide a robot system solving one, several or all of the foregoing objects.

According to a first aspect, there is provided a method of handling safety of an industrial robot of a robot system, the method comprising providing at least one virtual safety border defined in relation to the industrial robot, where each virtual safety border is associated with a condition to be fulfilled by the industrial robot; for each virtual safety border, performing an indication operation by the robot system, where the indication operation indicates a position of the virtual safety border in a physical workspace of the industrial robot; and for each indication operation, receiving a verification input from a user. The verification input may be a verification input based on which the position of the virtual safety border can be verified.

The method provides an efficient and intuitive solution to verify whether the one or more virtual safety borders are positioned as expected with respect to the industrial robot in the physical workspace. The method thus enables the user to quickly and reliably verify whether a safety configuration in a virtual environment corresponds to a safety configuration in a real environment. Since the time spent for the verification is reduced, also costs are reduced.

Moreover, due to the position of the virtual safety border being indicated in the physical workspace by the indication operation, the method enables the user to visually see where the virtual safety border is positioned in the physical workspace. The user does for example not need to wear MR (mixed reality) glasses to see the virtual safety borders.

The industrial robot may comprise a stationary base and a manipulator movable in three or more axes relative to the base, such as in six or seven axes.

The method may be carried out with a robot system of any type according to the present disclosure. The robot system may comprise a monitoring system. The monitoring system may be configured to monitor movements of the industrial robot with respect to the at least one virtual safety border. The monitoring system may provide monitoring functions that can intervene to stop the industrial robot during operation if a condition associated with the virtual safety border is violated by the industrial robot. The monitoring system may comprise a monitoring controller and a monitoring device for monitoring the workspace.

The one or more virtual safety borders may be generated in a virtual environment. The one or more virtual safety borders may be sent as a safety configuration, or as a part of a safety configuration, to a control system of the robot system. Each virtual safety border may be stationary in the workspace during operation of the industrial robot. Alternatively, or in addition, each virtual safety border may be vertically oriented, e.g. extending vertically from a floor.

The at least one virtual safety border may define a virtual safety region. The virtual safety region may for example be a two-dimensional or a three-dimensional region in the workspace. The virtual safety region may at least partly enclose the industrial robot and/or an obstacle in the workspace.

Each virtual safety border may be a surface. The surface may be of various shapes, including curved and planar surfaces. According to one example, one virtual safety border may be cylindrical to enclose the industrial robot.

The conditions may be of various types. When a condition is triggered, a constraint may be imposed on the industrial robot. According to one example, the condition comprises a stop of the industrial robot. According to a further example, the condition comprises a limitation of an operation parameter of the industrial robot. Examples of operation parameters include speed, acceleration, force, torque, and payload. According to a further example, the industrial robot is speed limited or stopped when an object other than the industrial robot appears between the virtual safety border and the industrial robot.

Upon receiving the verification input, associated with a virtual safety border, the industrial robot may automatically perform an indication operation for a next virtual safety border and so on.

The user may be a human user. The workspace may constitute, or may form part of, a cell.

The indication operation may comprise moving the industrial robot in the workspace to indicate the position of the virtual safety border. With this variant, no extra equipment may be needed for carrying out the method in comparison with normal operations of the industrial robot. The industrial robot may be moved close to the virtual safety border, e.g. such that a tool of the industrial robot is positioned at or close to the virtual safety border. Close in this regard may be less than 50 cm, such as less than 10 cm from the virtual safety border. The movement of the industrial robot to the virtual safety border may be performed with limited speed.

According to one variant, the indication operation may comprise moving the industrial robot close to and along one virtual safety border, e.g. such that the tool is moved along the virtual safety border. In this way, the position of the virtual safety border can be even more clearly indicated to the user. Thus, the indication operation does not necessarily need to comprise stopping of the industrial robot. The movements along one virtual safety border may be performed to indicate a partial or entire surface of the virtual safety border. The industrial robot may for example perform movements imitating a painting of the virtual safety border with a brush.

According to a further variant, the indication operation may comprise moving an indication object carried by the industrial robot such that the indication object is positioned at or close to the virtual safety border. Examples of indication objects comprise an elongated rod, a flat plate and a plummet suspended by a string.

When carrying out the method according to this variant, the monitoring functions may optionally be temporarily suspended. In this way, the industrial robot can move exactly to each virtual safety border without triggering the intervention by the monitoring system.

As an alternative or an addition to moving the industrial robot, the indication operation may comprise indicating a position of the virtual safety border in the workspace by light. To this end, the robot system may comprise a light source, such as a laser light source. The light source may for example irradiate a line on a floor of the workspace to indicate the position of the virtual safety border. The light source may be carried by the industrial robot or may be provided external to the industrial robot (either stationary or movable).

The method may further comprise storing each verification input in association with the respective virtual safety border. In this way, error tracking can be made easier.

The at least one virtual safety border may comprise a plurality of virtual safety borders. In this case, the method may further comprise simultaneously displaying the virtual safety borders on a display. The user can thereby easily keep track of the virtual safety borders to be verified.

The virtual safety borders may be visualized on the display. The user can thereby easily understand for which virtual safety border the indication operation is performed. A further advantage is that a shape of the virtual safety border can be seen, and the user can thereby more easily follow the nature of the indication operation. Also, the industrial robot may be visualized on the display and the virtual safety borders may be visualized in relation to the industrial robot on the display. As an alternative to visualizing the virtual safety borders, the virtual safety borders may be displayed by text information.

The method may further comprise, for each verification input, displaying verification information in association with the virtual safety border on the display. By displaying verification input in this way, the user knows which virtual safety border has been checked and the user can efficiently keep track of the verification process. Any redundant verification is thereby avoided. The verification information may be displayed as a checklist.

The verification input may be received by means of an input device. In this case, the input device may comprise the display. The input device may be a programming device for programming the industrial robot, such as a teach pendant unit (TPU).

The method may further comprise receiving a selection input from the user indicative of one of the at least one virtual safety border, and performing the indication operation for the selected virtual safety border. In this way, the user can for example choose in which order the respective indication operations should be carried out.

According to a second aspect, there is provided a control system for handling safety of an industrial robot of a robot system, the control system comprising at least one data processing device and at least one memory having at least one computer program stored thereon, the at least one computer program comprising program code which, when executed by the at least one data processing device, causes the at least one data processing device to perform the steps of providing at least one virtual safety border defined in relation to the industrial robot, where each virtual safety border is associated with a condition to be fulfilled by the industrial robot; for each virtual safety border, commanding performance of an indication operation by the robot system, where the indication operation indicates a position of the virtual safety border in a physical workspace of the industrial robot; and for each indication operation, receiving a verification input from a user. The verification input may be a verification input based on which the position of the virtual safety border can be verified. The at least one computer program may further comprise program code which, when executed by the at least one data processing device, causes the at least one data processing device to perform, or command performance of, any step described herein.

The indication operation may comprise moving the industrial robot in the workspace to indicate the position of the virtual safety border.

The at least one computer program may comprise program code which, when executed by the at least one data processing device, causes the at least one data processing device to store each verification input in association with the respective the virtual safety border.

The at least one virtual safety border may comprise a plurality of virtual safety borders. In this case, the at least one computer program may comprise program code which, when executed by the at least one data processing device, causes the at least one data processing device to command simultaneous display of the virtual safety borders on a display.

The virtual safety borders may be visualized on the display.

The at least one computer program may comprise program code which, when executed by the at least one data processing device, causes the at least one data processing device to, for each verification input, command display of verification information in association with the virtual safety border on the display.

The at least one computer program may comprise program code which, when executed by the at least one data processing device, causes the at least one data processing device to perform the steps of receiving a selection input from the user indicative of one of the at least one virtual safety border, and commanding performance of the indication operation for the selected virtual safety border.

According to a third aspect, there is provided a robot system comprising the industrial robot and the control system according to the second aspect. Each of the robot system and the industrial robot may be of any type as described herein.

The robot system may further comprise an input device for receiving the verification input. In this case, the input device may comprise the display. The input device may be of any type as described herein.

BRIEF DESCRIPTION OF THE DRAWINGS

Further details, advantages and aspects of the present disclosure will become apparent from the following description taken in conjunction with the drawings, wherein.

6

Figure 2:
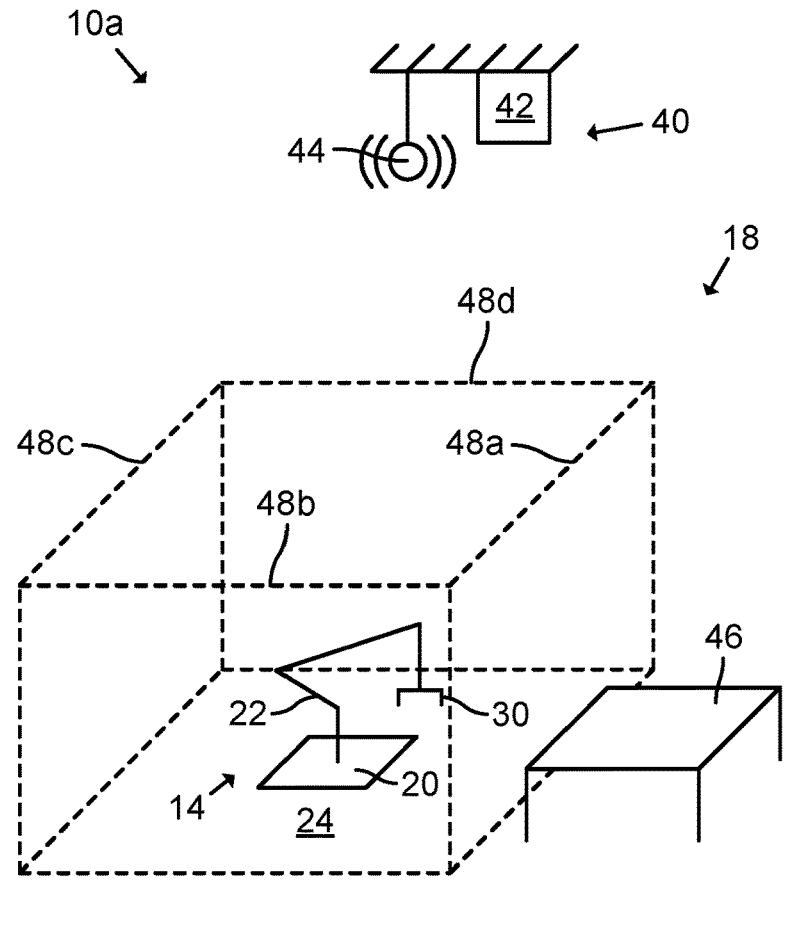
FIG. 2: schematically represents a perspective view of the robot system and virtual safety borders.
Figure 4A:
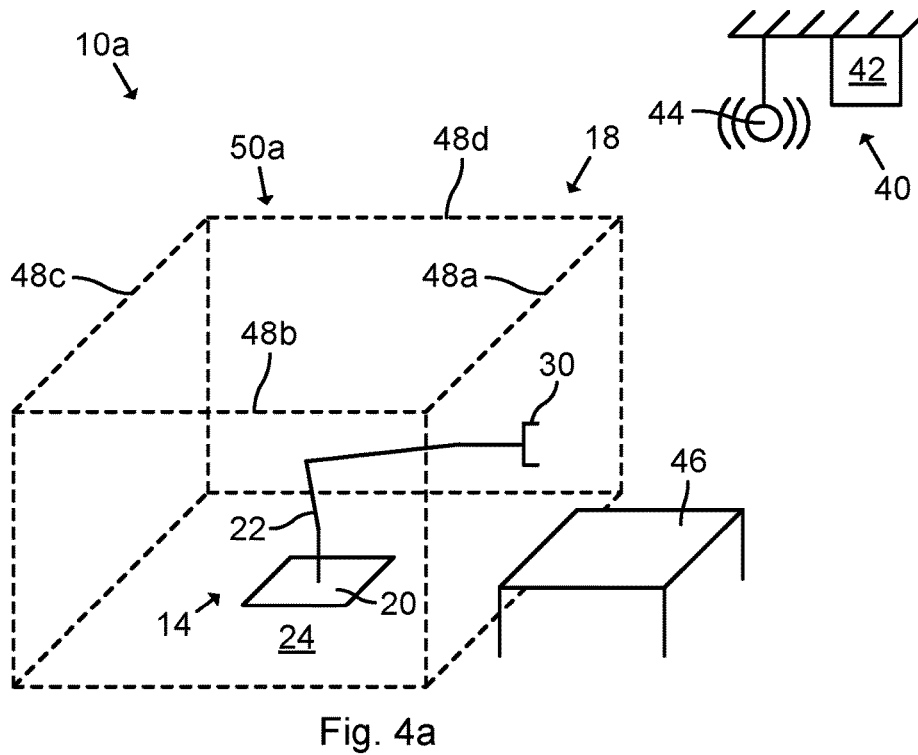
Figure 4B:
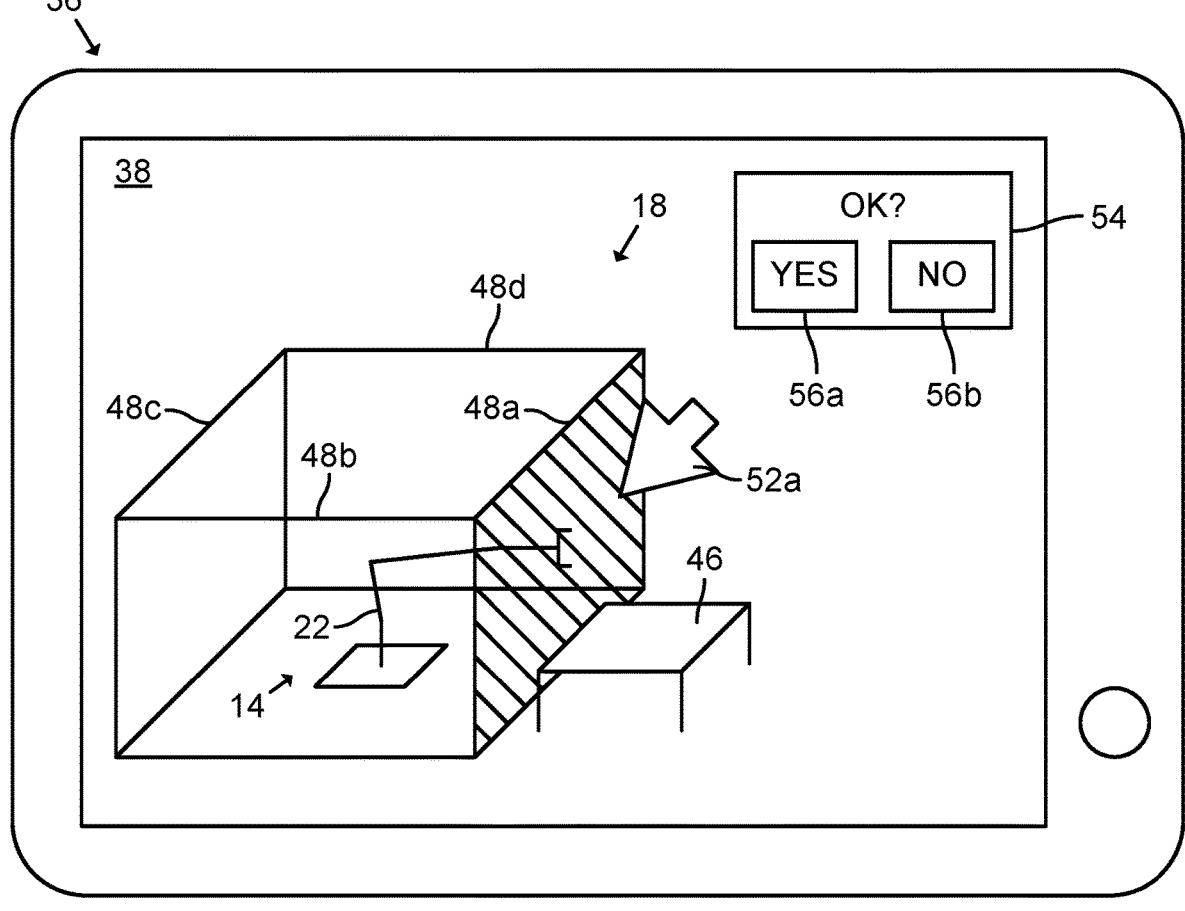

FIG. 4*a*: schematically represents a perspective view of the robot system and one example of an indication operation for one of the virtual safety borders in FIG. 2;

FIG. 4*b*: schematically represents the input device displaying information associated with the indication operation in FIG. 4*a;*

Figure 5A:
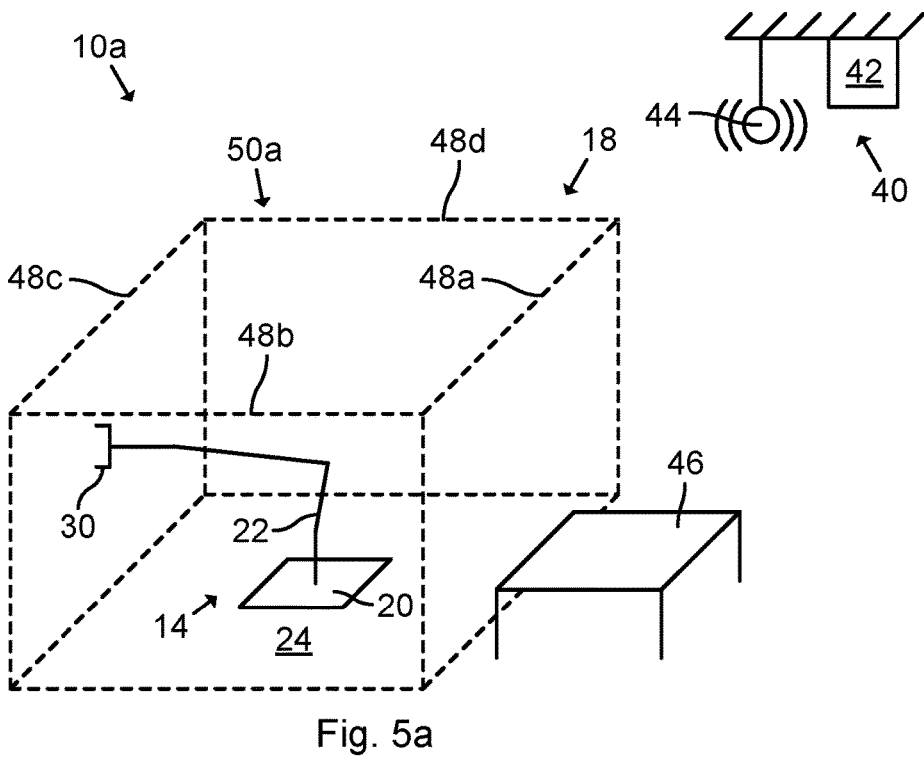
Figure 5B:
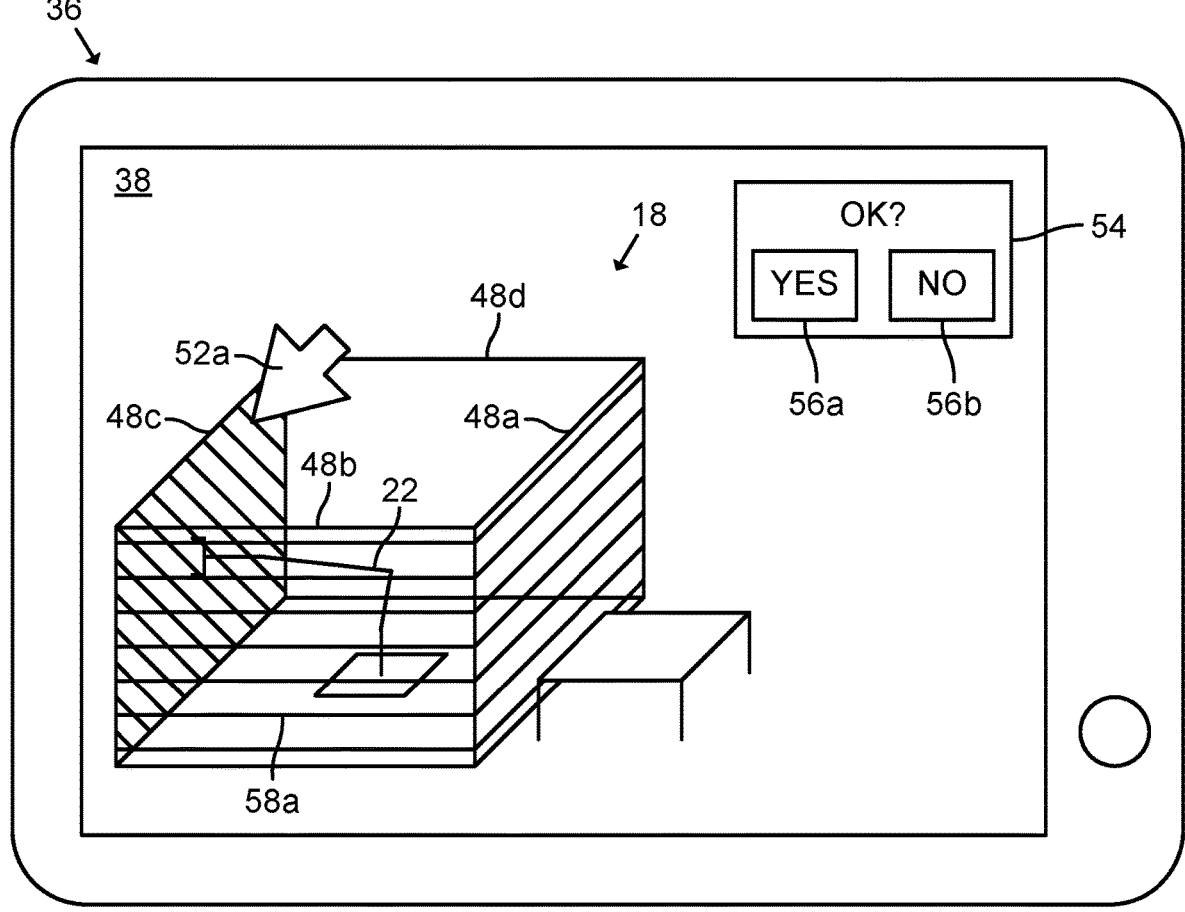

FIG. 5*a*: schematically represents a perspective view of the robot system and the indication operation for another of the virtual safety borders;

FIG. 5*b*: schematically represents the input device displaying information associated with the indication operation in FIG. 5*a;*

Figure 6A:
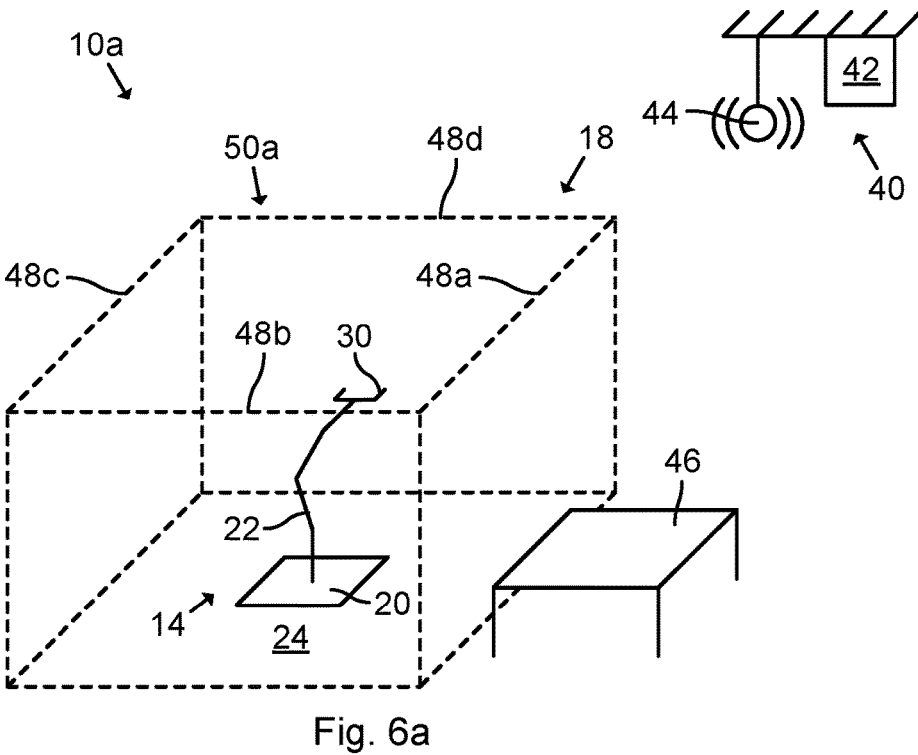
Figure 6B:
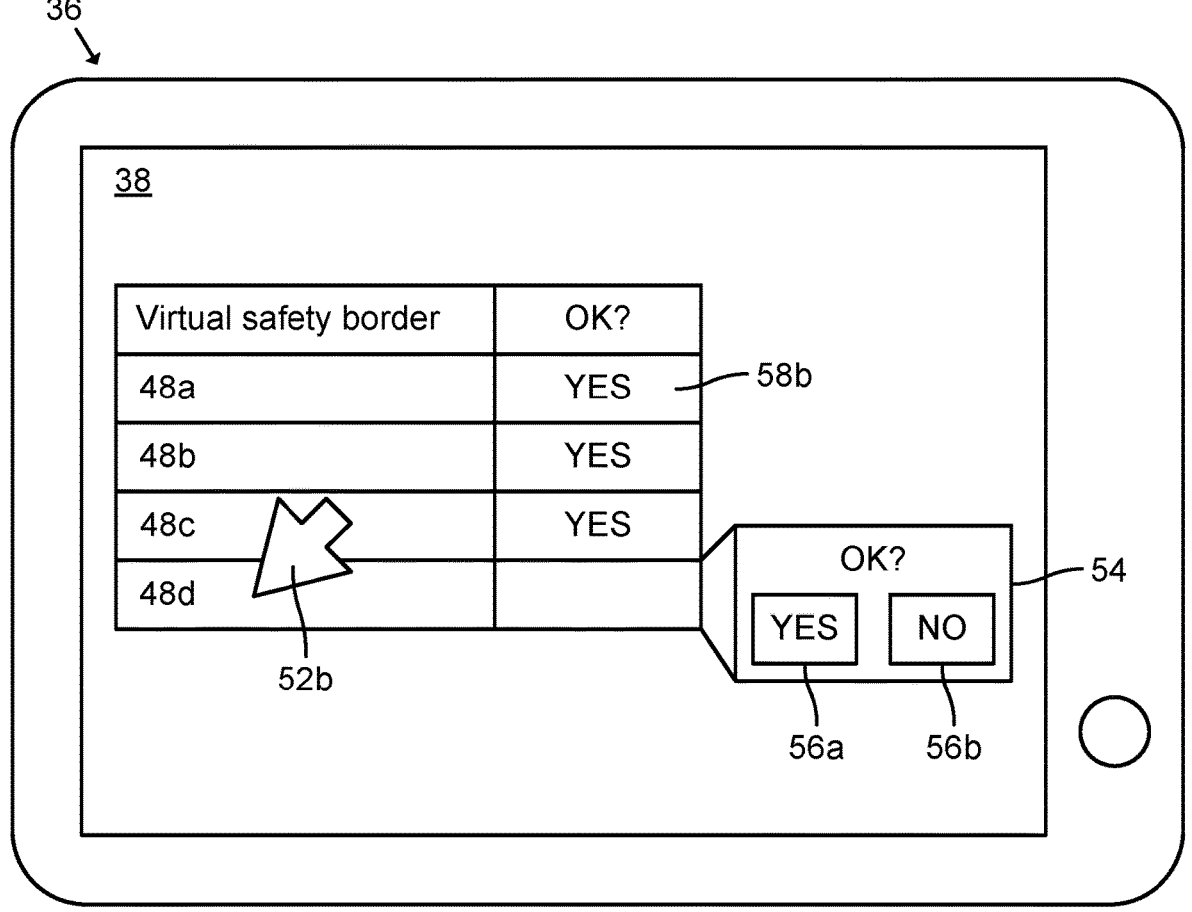

FIG. 6*a*: schematically represents a perspective view of the robot system and the indication operation for yet another of the virtual safety borders;

FIG. 6*b*: schematically represents the input device displaying a further type of information associated with the indication operation in FIG. 6*a;*

Figure 7:
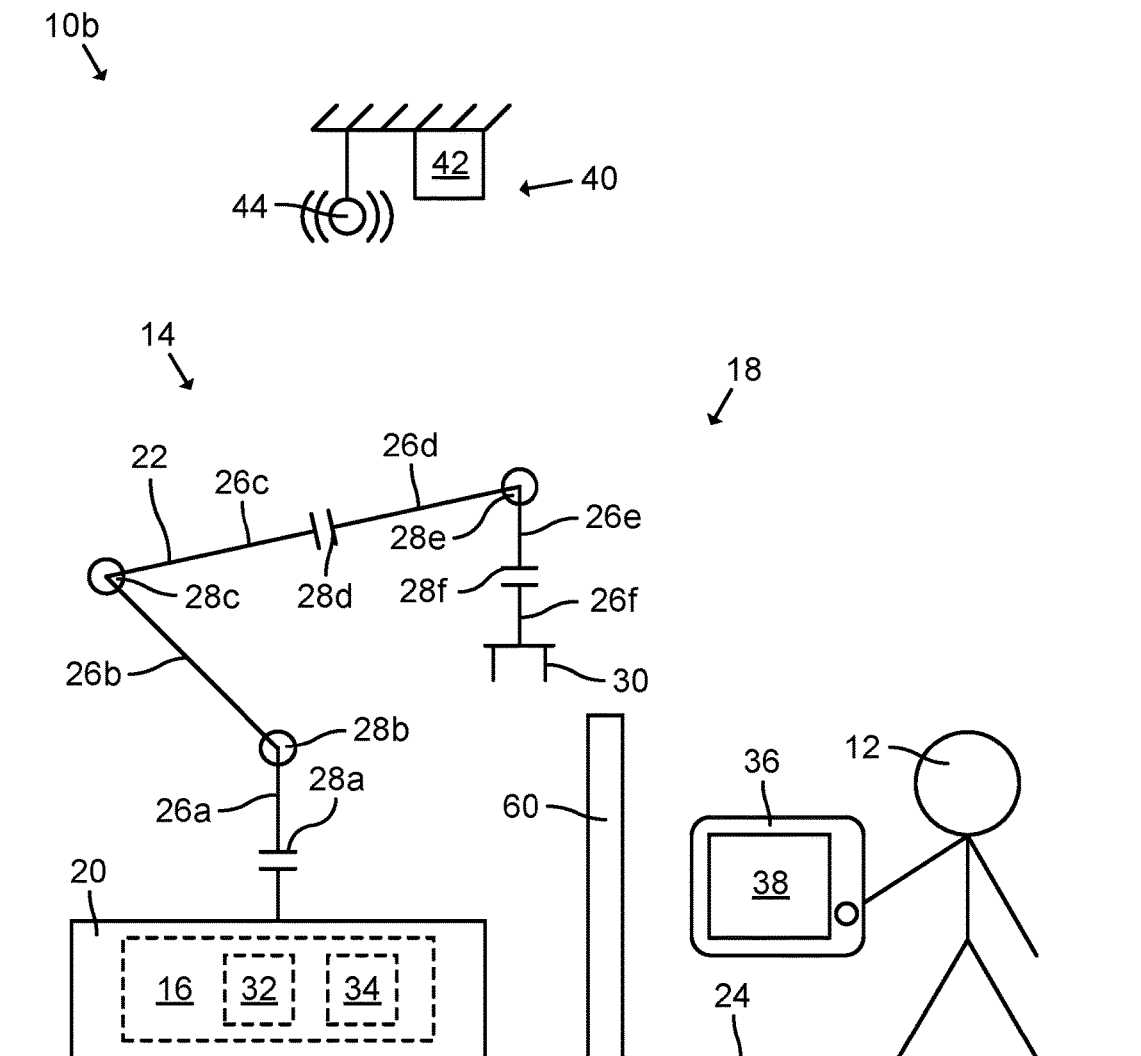
Figure 8A:
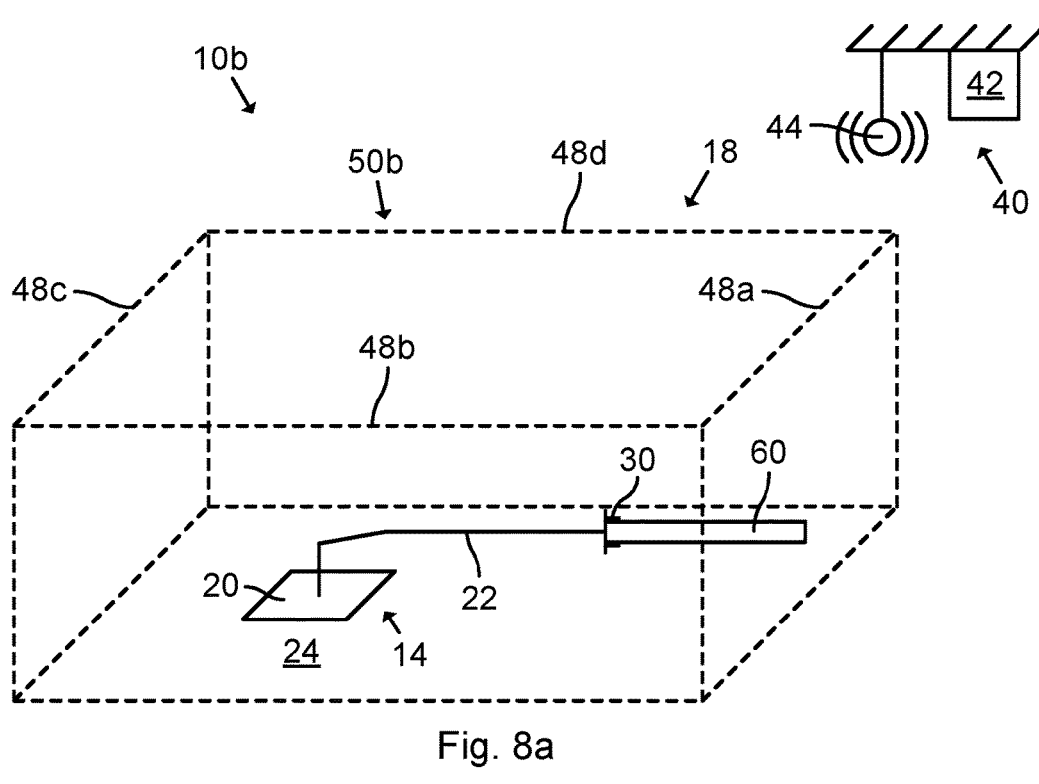
Figure 8B:
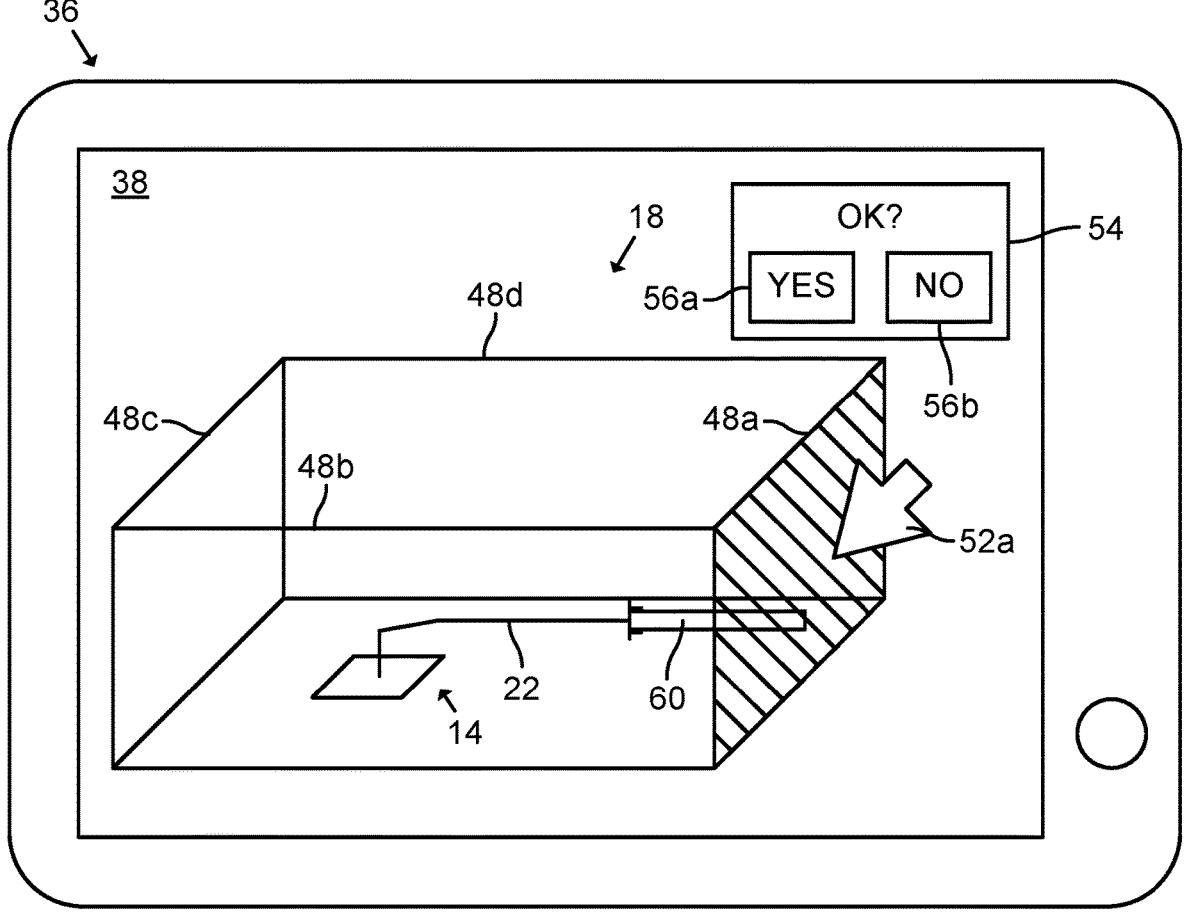

FIG. 7: schematically represents a side view of the user and a further example of a robot system comprising the industrial robot, the input device and an indication object;

FIG. 8*a*: schematically represents a perspective view of the robot system in FIG. 7 and one example of an indication operation for one of the virtual safety borders using the indication object;

FIG. 8*b*: schematically represents the input device displaying information associated with the indication operation in FIG. 8*a;*

Figure 9:
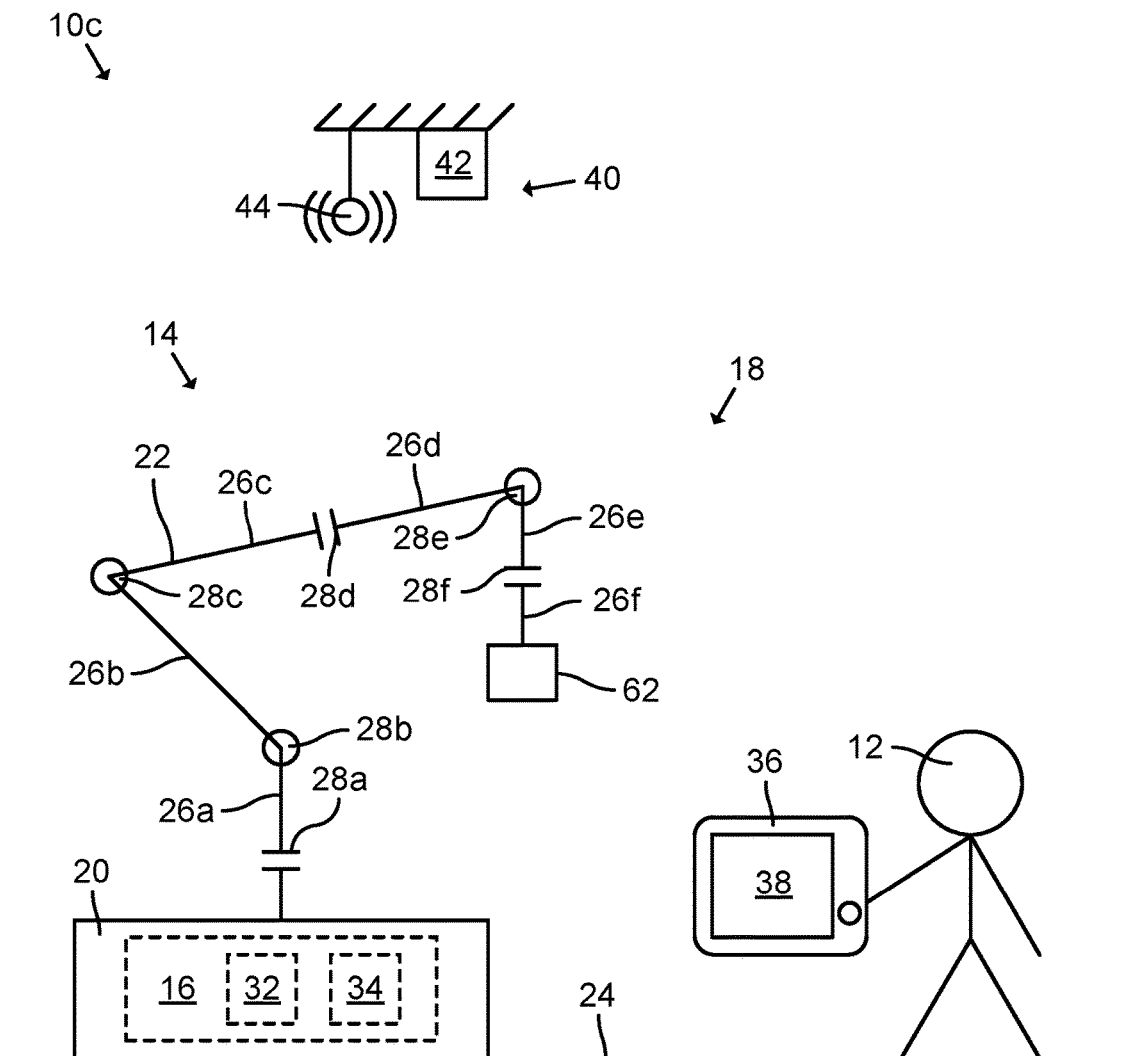
Figure 10A:
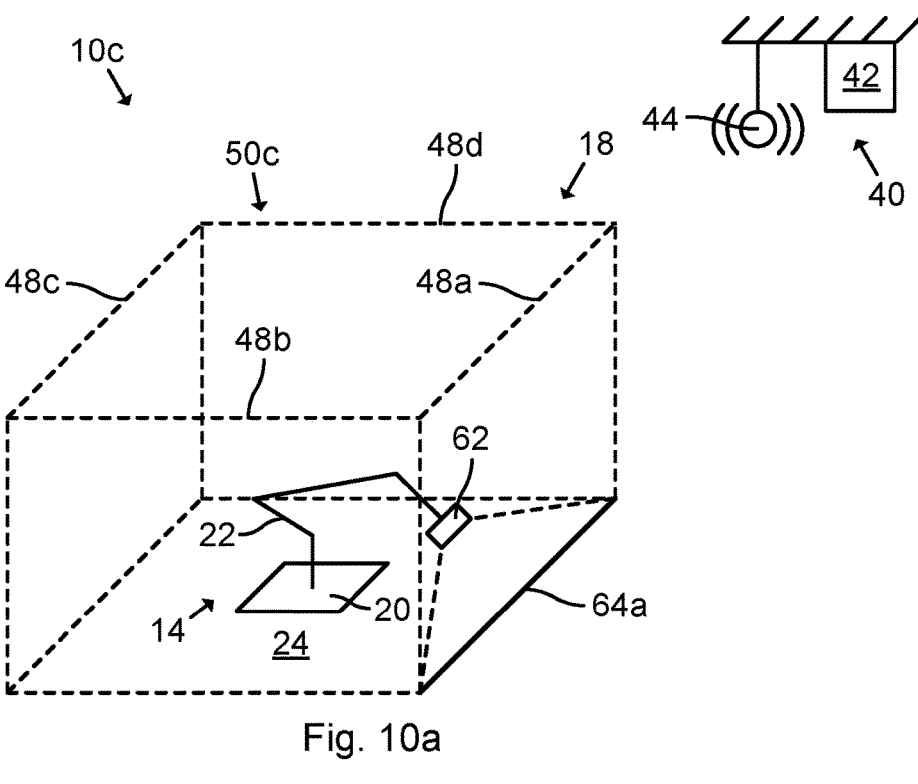
Figure 10B:
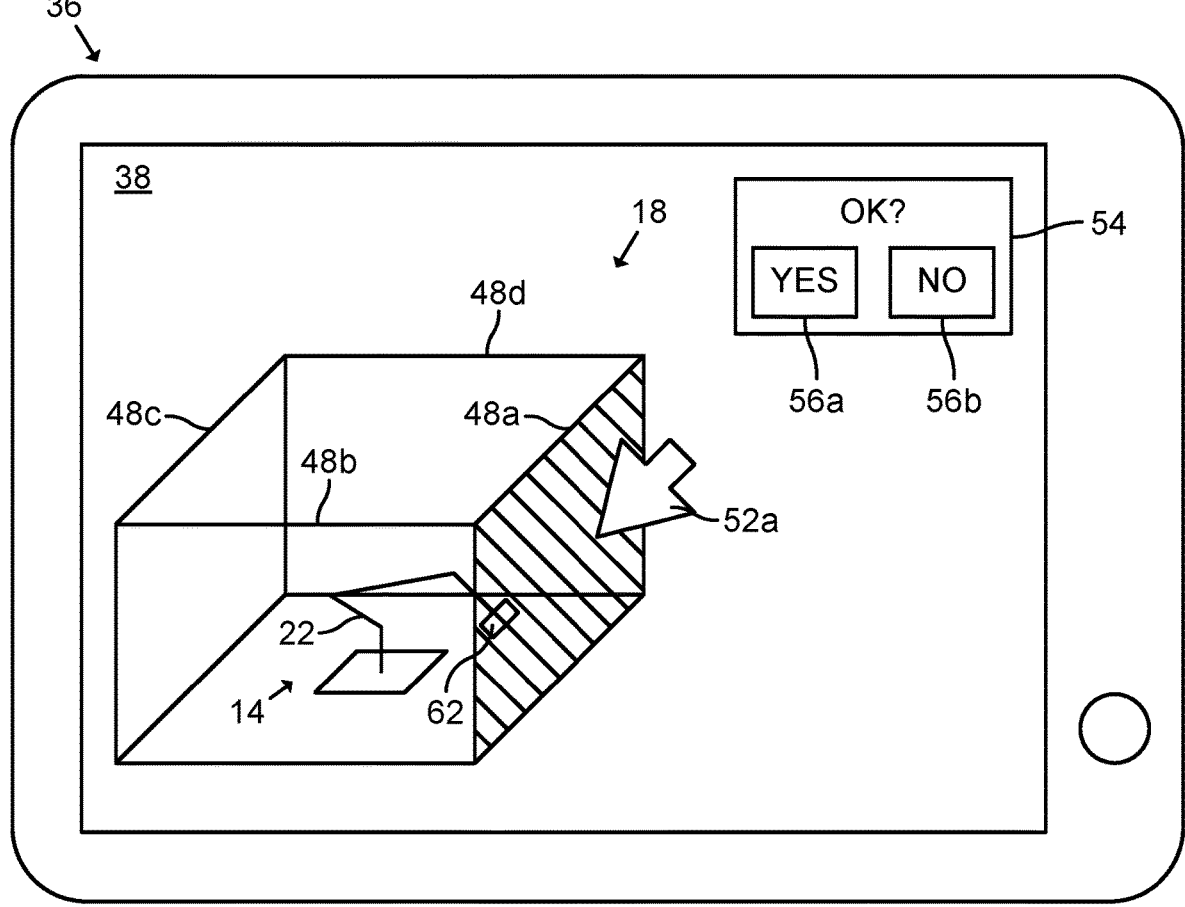

FIG. 9: schematically represents a side view of the user and a further example of a robot system comprising the industrial robot, a movable light source carried by the industrial robot and the input device;

FIG. 10*a*: schematically represents a perspective view of the robot system in FIG. 9 and one example of an indication operation for one of the virtual safety borders using the movable light source;

FIG. 10*b*: schematically represents the input device displaying information associated with the indication operation in FIG. 10*a;*

Figure 11:
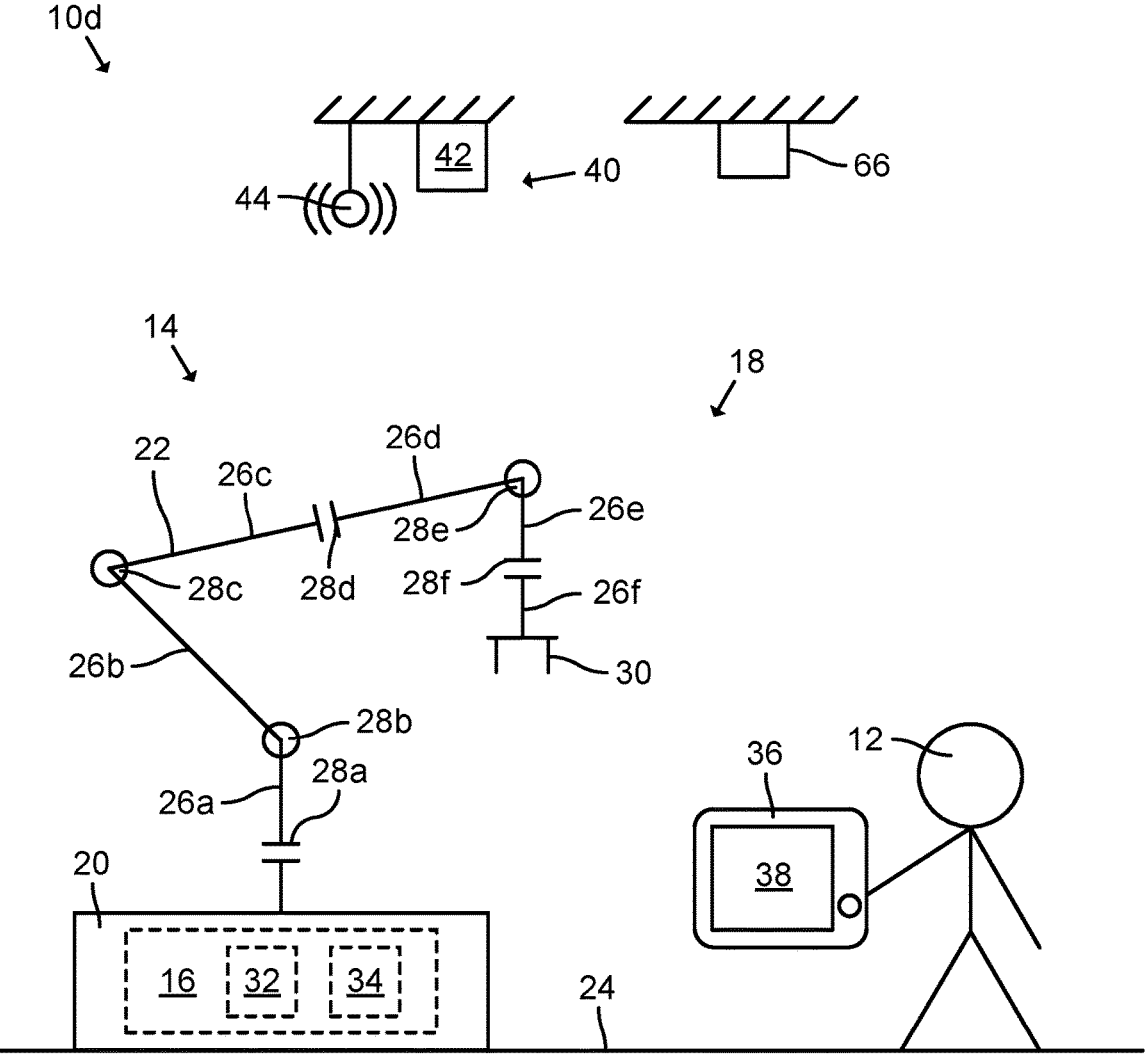
Figure 12A:
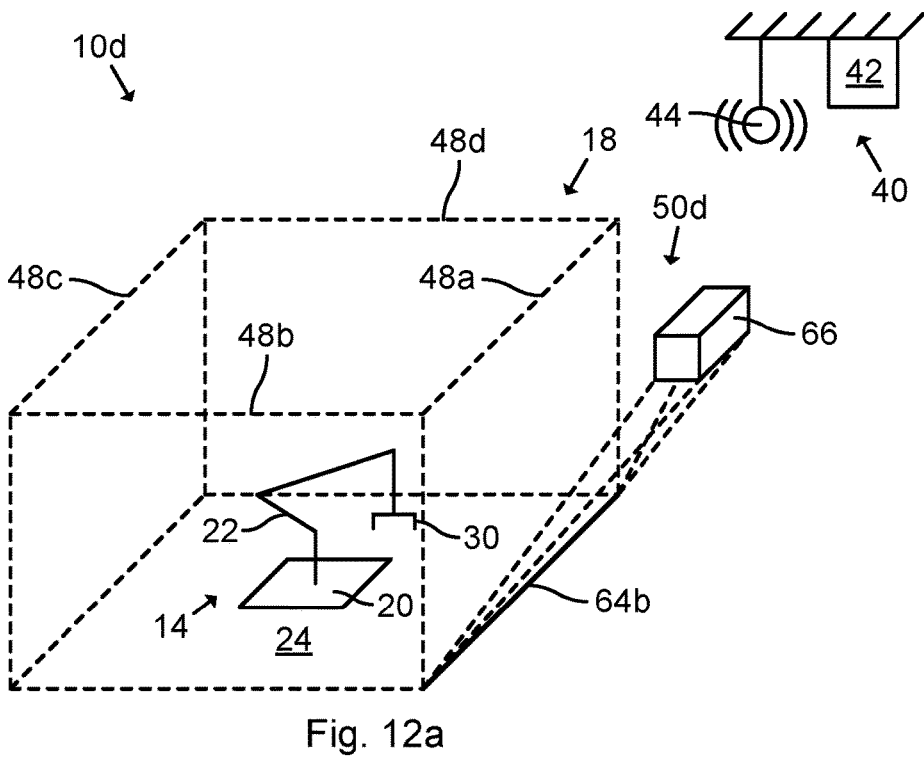
Figure 12B:
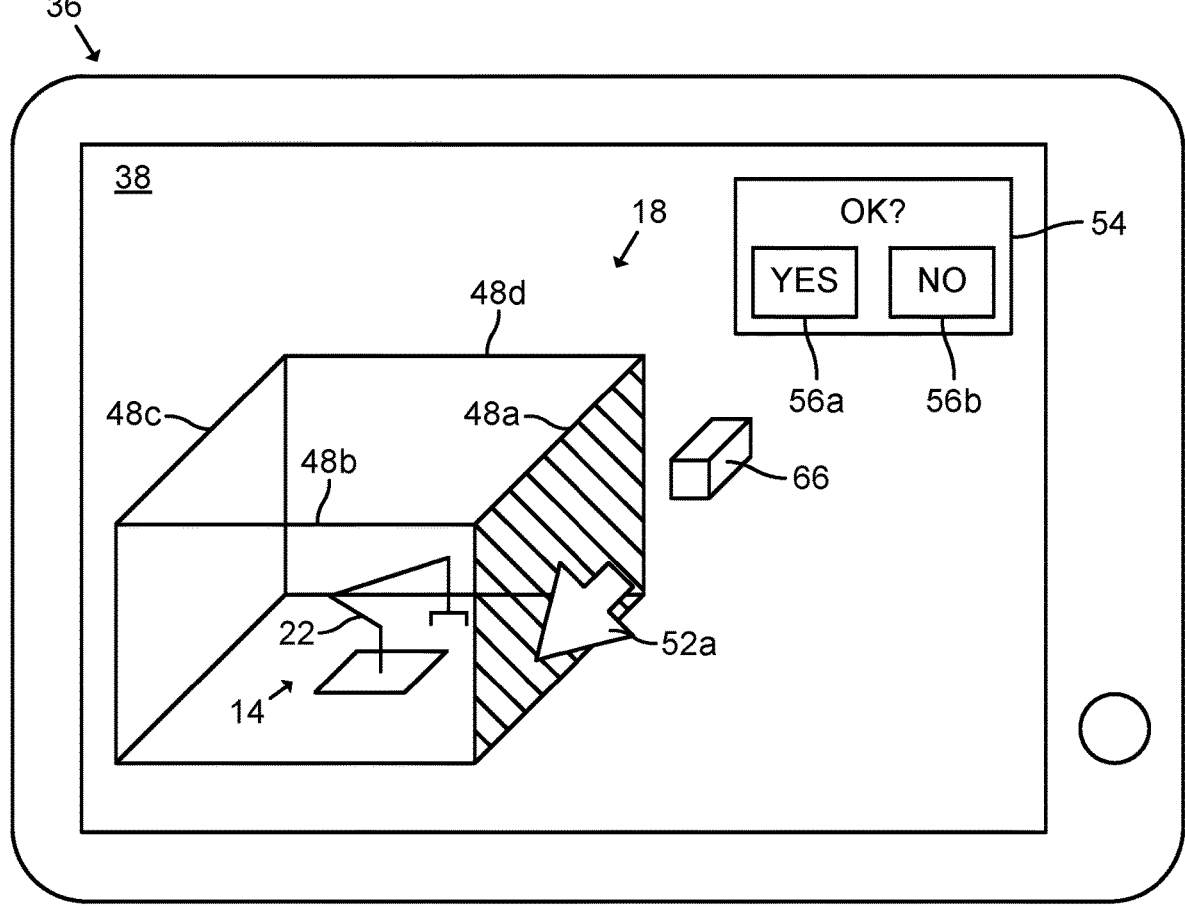

FIG. 11: schematically represents a side view of the user and a further example of a robot system comprising the industrial robot, a stationary light source and the input device;

FIG. 12*a*: schematically represents a perspective view of the robot system in FIG. 11 and one example of an indication operation for one of the virtual safety borders using stationary light source; and FIG. 12*b*: schematically represents the input device displaying information associated with the indication operation in FIG. 12*a*.

DETAILED DESCRIPTION

In the following, a method of handling safety of an industrial robot of a robot system, a control system for handling safety of an industrial robot of a robot system, and a robot system comprising an industrial robot and a control system, will be described. The same or similar reference numerals will be used to denote the same or similar structural features.

Figure 1:
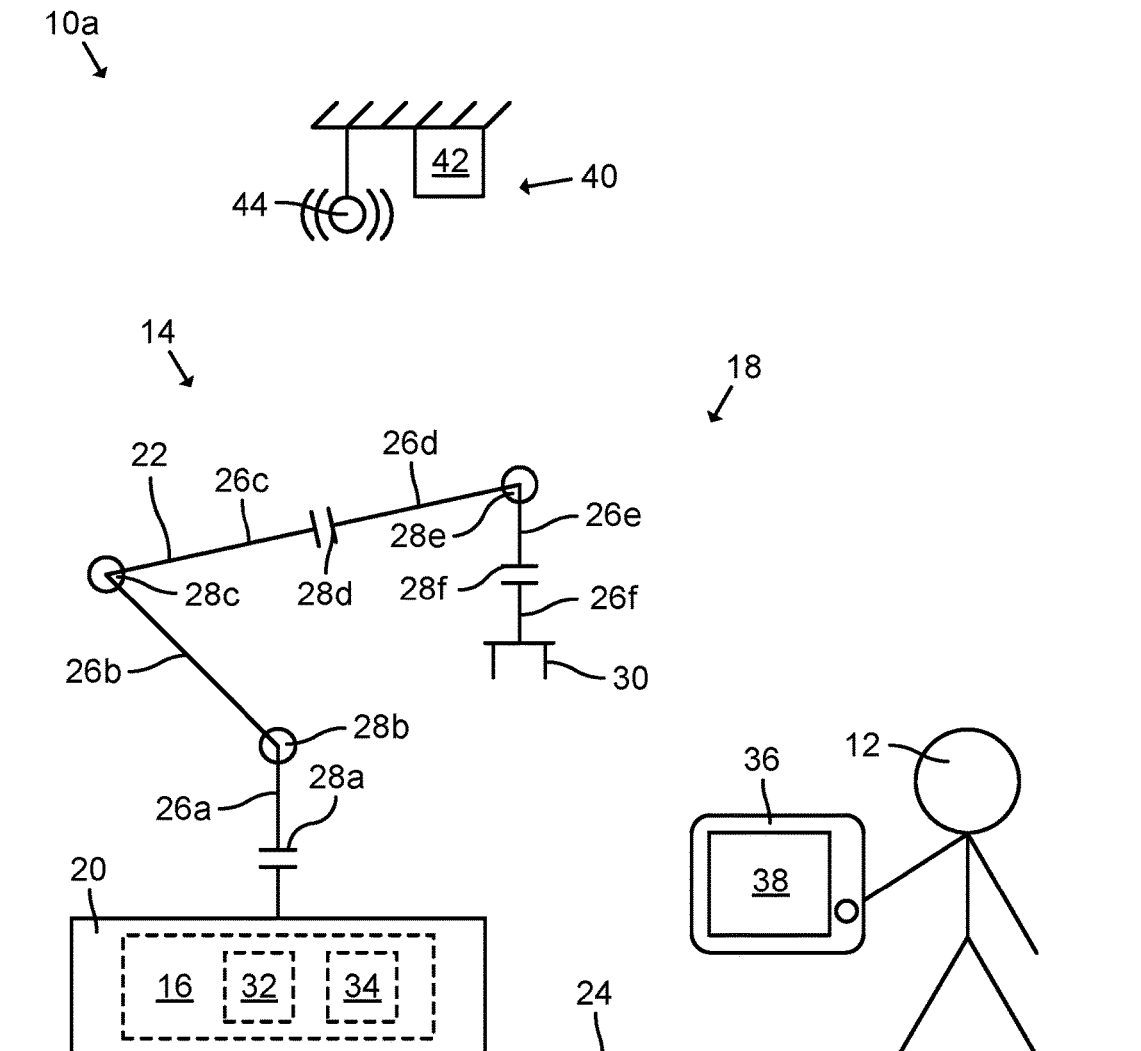
FIG. 1: schematically represents a side view of a user and a robot system comprising an industrial robot and an input device.

FIG. 1 schematically represents a side view of a robot system 10*a* and a user 12. The robot system 10*a* comprises an industrial robot 14 and a control system 16. The industrial robot 14 is positioned in a physical workspace 18.

The industrial robot 14 comprises a base 20 and a manipulator 22 movable relative to the base 20. The base 20 is here positioned on a floor 24. The manipulator 22 of this specific example comprises a first link 26a rotatable relative to the base 20 at a first axis 28a, a second link 26b rotatable relative to the first link 26a at a second axis 28b, a third link 26c rotatable relative to the second link 26b at a third axis 28c, a fourth link 26d rotatable relative to the third link 26c at a fourth axis 28d, a fifth link 26e rotatable relative to the fourth link 26d at a fifth axis 28e, and a sixth link 26f rotatable relative to the fifth link 26e at a sixth axis 28f.

The industrial robot 14 further comprises a tool 30, here exemplified as a gripper. The tool 30 is in this example fixed to the sixth link 26f. The manipulator 22 in FIG. 1 is a serial manipulator and the tool 30 is provided at a distal end of a kinematic chain thereof. The industrial robot 14 in FIG. 1 is however only one of many examples. The manipulator 22 may for example alternatively or additionally comprise one or more translational joints.

The control system 16 is configured to control operations of the industrial robot 14. The control system 16 of this example comprises a data processing device 32 and a memory 34. The memory 34 comprises a computer program containing program code, which when executed by the data processing device 32, causes the data processing device 32 to execute, or command execution of, various steps as described herein.

The robot system 10a of this example further comprises a teach pendant unit, TPU, 36. The TPU 36 is one example of an input device according to the present disclosure. The TPU 36 comprises a display 38. The TPU 36 is here carried by the user 12. By means of the TPU 36, the user 12 can perform various programming tasks on the industrial robot 14. The user 12 can for example jog the manipulator 22 to a desired position with the TPU 36. The user 12 is here a human integrator for an automation cell comprising the industrial robot 14.

The robot system 10a of this example further comprises a monitoring system 40. The monitoring system 40 comprises a monitoring controller 42 and a monitoring device 44. The monitoring controller 42 is in signal communication with the control system 16. The monitoring device 44 is here exemplified as a lidar but may be another type of sensor configured to detect movements of the industrial robot 14 within the workspace 18. The monitoring device 44 is in signal communication with the monitoring controller 42. The monitoring system 40 may comprise a plurality of such monitoring devices 44.

FIG. 2 schematically represents a perspective view of the robot system 10a.

In FIG. 2, a table 46 is positioned in the workspace 18 of the industrial robot 14. The table 46 is one example of an obstacle according to the present disclosure.

FIG. 2 further shows four virtual safety borders 48a-48d. The virtual safety borders 48a-48d are invisible to the user 12. The virtual safety borders 48a-48d are stationary in the workspace 18 and are defined in relation to the industrial robot 14. The virtual safety borders 48a-48d are here exemplified as four interconnected vertical and planar surfaces extending from the floor 24 and surrounding the industrial robot 14. The virtual safety borders 48a-48d provide a three-dimensional virtual safety region containing the industrial robot 14. The table 46 is positioned outside this virtual safety region.

Each virtual safety border 48a-48d is associated with a condition to be fulfilled by the industrial robot 14. In this example, the condition for each virtual safety border 48a-48d is a stop of the industrial robot 14. The industrial robot 14 is allowed to move freely inside the virtual safety borders 48a-48d, but the industrial robot 14 should be stopped if crossing any of the virtual safety borders 48a-48d. The virtual safety borders 48a-48d and the associated conditions constitute one example of a safety configuration according to the present disclosure.

A virtual design of the workspace 18 including the virtual safety borders 48a-48d is created in a virtual environment, such as in RobotStudio® sold by ABB. The industrial robot 14 is then installed in the physical workspace 18 along with any surrounding equipment. Examples of such equipment comprise CNC (computer numerical control) machines, conveyor belts, fences and similar. Also, such equipment constitute examples of obstacles according to the present disclosure.

During operation of the industrial robot 14, the monitoring system 40 monitors the workspace 18 in view of the safety configuration. If the conditions associated with the virtual safety borders 48a-48d are not met by the industrial robot 14, the monitoring system 40 commands a protective stop of the industrial robot 14.

In this example, the monitoring system 40 functions independently of the industrial robot 14. With the introduction of the monitoring system 40 to the robot system 10a, no physical fence is needed. Instead, the safety supervision provided by the monitoring system 40 is used as protection.

Figure 3:
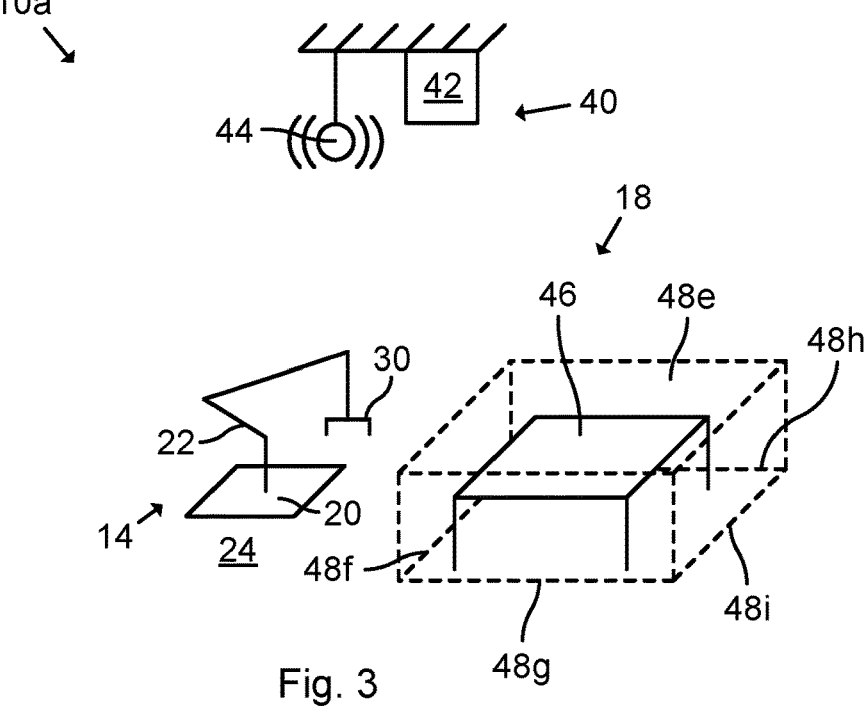
FIG. 3: schematically represents a perspective view of the robot system and further examples of virtual safety borders.

FIG. 3 schematically represents a perspective view of the robot system 10a and further examples of virtual safety borders 48e-48i. Mainly differences with respect to FIG. 2 will be described. The virtual safety borders 48f-48i are here exemplified as four interconnected vertical and planar surfaces extending from the floor 24 and surrounding the table 46, and the virtual safety border 48e is exemplified as a horizontal planar surface interconnecting the virtual safety borders 48f-48i above the table 46. The virtual safety borders 48e-48i provide a three-dimensional virtual safety region containing table 46. The industrial robot 14 is positioned outside this virtual safety region.

Again, each virtual safety border 48e-48i is associated with a condition. Also in this example, the condition for each virtual safety border 48e-48i is a stop of the industrial robot 14. The industrial robot 14 is allowed to move freely outside the virtual safety borders 48e-48i, but the industrial robot 14 should be stopped if crossing any of the virtual safety borders 48e-48i. The virtual safety borders 48e-48i and the associated conditions constitute a further example of a safety configuration according to the present disclosure.

FIG. 4a schematically represents a perspective view of the robot system 10a and one example of an indication operation 50a performed by the robot system 10a. FIG. 4b schematically represents the TPU 36 when the indication operation 50a in FIG. 4a is performed. One example of a method of handling safety of the industrial robot 14 will now be described. In FIGS. 4a and 4b, the virtual safety borders 48a-48d in FIG. 2 are shown. The method may however alternatively be performed for the virtual safety borders 48e-48i in FIG. 3 or for a wide range of alternative types of virtual safety borders. Once the workspace 18 is set up, the positions of the virtual safety borders 48a-48d in the real environment need to be checked, e.g. to avoid collisions between the industrial robot 14 and the table 46.

By adding the virtual safety borders 48a-48d and simulating movements of the industrial robot 14 in the virtual environment, it can be ensured that no collisions between the industrial robot 14 and any surrounding obstacles will occur in the virtual environment. However, the user 12 has to verify that this is the case also in the physical workspace 18.

As shown in FIG. 4b, the workspace 18 comprising the industrial robot 14 and the virtual safety borders 48a-48d is visualized on the display 38. Also, the table 46 is visualized on the display 38. Due to the visualization, the user 12 can for example see the geometry of the virtual safety borders 48a-48d and the relationship between the virtual safety borders 48a-48d and the industrial robot 14.

The user 12 provides a selection input 52a to the TPU 36. The selection input 52a is here exemplified as a click on the virtual safety border 48a on the display 38, for example by a direct touch by a finger of the user 12 or by using the illustrated arrow. The selection input 52a thus indicates a selection of the virtual safety border 48a. As shown in FIG. 4b, the virtual safety border 48a becomes highlighted in response to the selection input 52a. In this specific example, the selected virtual safety border 48a is highlighted with diagonal lines.

In response to the selection input 52a indicating a selection of the virtual safety border 48a, the industrial robot 14 performs the indication operation 50a that indicates the position of the selected virtual safety border 48a in the physical workspace 18, as shown in FIG. 4a. The indication operation 50a comprises a movement of the industrial robot 14. In response to the selection input 52a, the industrial robot 14 moves slowly to the face of the virtual safety border 48a. In this example, the tool 30 is moved to a position less than 1 cm inside the virtual safety border 48a and stops. The virtual safety border 48a is thereby visualized to the user 12.

Optionally, the monitoring system 40 may be temporarily suspended. In this case, the industrial robot 14 can position the tool 30 exactly on the virtual safety border 48a without triggering a safety reaction from the monitoring system 40.

Even though the user 12 cannot see the virtual safety borders 48a as such in the workspace 18, the user 12 gathers information of the position of the virtual safety border 48a in the workspace 18 due to the positioning of the industrial robot 14. The user 12 then checks whether the position of the virtual safety border 48a is as expected in the workspace 18. In this way, the safety configuration from the virtual workspace can be validated in the physical workspace 18.

The user 12 checks whether the virtual safety border 48a, as indicated by the industrial robot 14 in the workspace 18, appears to be correctly positioned, e.g. such that there is no risk for collision with the table 46. For example, the user 12 may have positioned the virtual safety border 48a 10 cm from the table 46 in the virtual workspace. By means of the method, the user 12 can easily verify that the virtual safety border 48a seems to be positioned 10 cm from the table 46 also in the real workspace 18.

As shown in FIG. 4b, the TPU 36 of this specific example displays a dialog box 54 on the display 38. The dialog box 54 here contains a verification input 56a exemplified as a YES-button and a verification input 56b exemplified as a NO-button. If the user 12 is satisfied with the position of the virtual safety border 48a, the user 12 provides the verification input 56a ("YES") to verify the virtual safety border 48a. If not, the user 12 provides the verification input 56b ("NO"). The verification input 56a or 56b is stored in association with the virtual safety border 48a currently indicated by the indication operation 50a.

The industrial robot 14 may then proceed with performing a next indication operation 50a for the virtual safety border 48b. This indication operation 50a may be performed automatically, for example when the user 12 has provided the verification input 56a or 56b for the virtual safety border 48a. Alternatively, the user 12 may instruct the industrial robot 14 to perform an indication operation 50a for a specific virtual safety border 48a-48d by the selection input 52a, here by clicking on the desired virtual safety border 48a-48d on the display 38. In any case, the verifications are made under direct supervision by the user 12.

If the user 12 provides the verification input 56b indicating that the position of the virtual safety border 48a is not approved, the user 12 may modify the position of the virtual safety border 48a. The modification may be performed with the TPU 36, for example by jogging the industrial robot 14 to a different position and command a corresponding repositioning of the virtual safety border 48a. The indication operation 50a may then be performed again for the modified virtual safety border 48a with a modified environment displayed on the display 38.

FIG. 5a schematically represents a perspective view of the robot system 10a when performing the indication operation 50a for the virtual safety border 48c. FIG. 5b schematically represents the TPU 36 when the indication operation 50a in FIG. 5a is performed. As shown in FIG. 5b, the virtual safety borders 48a and 48b that have been verified are provided with corresponding verification information 58a. The verification information 58a is here exemplified as a highlighting of the virtual safety borders 48a and 48b with horizontal lines. In this way, the user 12 can very easily see which virtual safety borders 48a-48d have been verified and which virtual safety borders 48a-48d are left for the user 12 to verify.

The user 12 now provides the selection input 52a to the virtual safety border 48c visualized on the display 38 (e.g. by clicking thereon). The selected virtual safety border 48c becomes highlighted on the display 38.

In response to the selection input 52a indicating a selection of the virtual safety border 48c, the industrial robot 14 performs the indication operation 50a that indicates the position of the selected virtual safety border 48c in the physical workspace 18. The industrial robot 14 now moves slowly to the face of the virtual safety border 48c, here to a position less than 1 cm inside the virtual safety border 48c, and stops. The virtual safety border 48c is thereby visualized to the user 12.

Based on the indication operation 50a for the virtual safety border 48c, the user 12 evaluates whether the virtual safety border 48c is positioned as desired in the workspace 18. If the user 12 is satisfied with the position of the virtual safety border 48c, the user 12 provides the verification input 56a ("YES") to verify the virtual safety border 48c. The industrial robot 14 may then proceed with performing the indication operation 50a for the last virtual safety border 48d. Since the user 12 at all times sees which virtual safety borders 48a-48d have been verified as correct and which virtual safety border 48a-48d that is currently under evaluation, the user 12 can intuitively keep track of the verifications and avoid redundant work. The method therefore generates substantial time savings for the user 12 when evaluating the virtual safety borders 48a-48d.

When one or more virtual safety borders 48a-48d have been verified, a report may be automatically generated. The report may comprise information regarding which virtual safety borders 48a-48d have been verified and which are left to be verified (if any). For example, the industrial robot 14 may not be able to reach all virtual safety borders 48a-48d.

In order to move the industrial robot 14 to the virtual safety borders 48a-48d, one or more target points for the industrial robot 14 may be automatically generated. Examples of such target points may comprise one or more target points at or close to edges of the virtual safety borders 48a-48d and/or one or more target points at or close to a center point on the respective virtual safety borders 48a-48d. The industrial robot 14 may thus move the tool 30 to each face of the virtual safety borders 48a-48d and/or to each vertex associated with the virtual safety borders 48a-48d. Optionally, the indication operation 50a may comprise moving the industrial robot 14 along such face or vertex of the virtual safety border 48a-48d to be verified.

The virtual safety borders 48e-48i in FIG. 3 can be verified in a manner corresponding to the verification of the virtual safety borders 48a-48d in FIGS. 2, 4a, 4b, 5a and 5b.

FIG. 6a schematically represents a perspective view of the robot system 10a and the indication operation 50a for the virtual safety border 48d. FIG. 6b schematically represents the TPU 36 displaying a further type of information associated with the indication operation 50a in FIG. 6a. Mainly differences with respect to FIGS. 4b and 5b will be described. In FIG. 6b, the workspace 18 is not visualized on the display 38. Instead, the display 38 displays a table comprising a column listing the virtual safety borders 48a-48d and a column listing a further example of verification information 58b for the respective virtual safety borders 48a-48d. In the table, all virtual safety borders 48a-48d can be seen simultaneously. Moreover, the virtual safety borders 48a-48c that have been verified as correct are provided with corresponding verification information 58b ("YES"). Also in this way, the user 12 can very easily see which virtual safety borders 48a-48d have been verified and which virtual safety borders 48a-48d are left for the user 12 to verify.

The user 12 now provides a further example of a selection input 52b to the virtual safety border 48d listed on the display 38 (e.g. by clicking thereon). The selected virtual safety border 48d becomes highlighted on the display 38 and the dialog box 54 appears next to the marked virtual safety border 48d.

In response to the selection input 52b indicating a selection of the virtual safety border 48d, the industrial robot 14 performs the indication operation 50a that indicates the position of the selected virtual safety border 48d in the physical workspace 18, as shown in FIG. 6a. Again, the user 12 evaluates whether the virtual safety border 48d is positioned as desired in the workspace 18. If the user 12 is satisfied with the position of the virtual safety border 48d, the user 12 provides the verification input 56a ("YES") to verify the virtual safety border 48d.

FIG. 7 schematically represents a side view of the user 12 and a further example of a robot system 10b. Mainly differences with respect to the robot system 10a will be described. The robot system 10b further comprises an indication object 60, here exemplified as an elongated rod. The length of the indication object 60 is known. The indication object 60 is preferably made in a light-weight and relatively soft material such that it is unlikely to make any damage even if it would collide with any surrounding obstacle.

FIG. 8a schematically represents a perspective view of the robot system 10b and a further example of an indication operation 50b for the virtual safety border 48a using the indication object 60, and FIG. 8b schematically represents the TPU 36 displaying information associated with the indication operation 50b in FIG. 8a. The indication operation 50b differs from the indication operation 50a in that the indication object 60 is carried by the industrial robot 14 and moved to the respective virtual safety borders 48a-48d for verification. As shown in FIG. 8a, when performing the indication operation 50b for the virtual safety border 48a, the indication object 60 is held by the tool 30 at one end and moved by the industrial robot 14 such that the opposite end of the indication object 60 is positioned at or close to the virtual safety border 48a. In this way, the robot system 10b performs the indication operation 50b indicating the position of the virtual safety border 48a in the physical workspace 18. The user 12 can now verify the position of the virtual safety border 48a based on the position of the indication object 60 in the physical workspace 18.

Even if the industrial robot 14 alone cannot reach the virtual safety border 48a, it may still be important to verify the real position thereof. One example when this is important is when the industrial robot 14 will carry large objects during operation and where also these carried objects should be kept inside the virtual safety border 48a. This is where the indication object 60 reaching beyond the reach of the industrial robot 14 alone becomes useful. Another reason for using the indication object 60, particularly one made in a light-weight and relatively soft material, may be avoiding any damage on the industrial robot 14 or on any surrounding obstacle even if a collision during the indication operation 50b would occur.

FIG. 9 schematically represents a side view of the user 12 and a further example of a robot system 10c. Mainly differences with respect to the robot system 10a will be described. The robot system 10c further comprises a movable light source 62. The movable light source 62 is carried by the industrial robot 14, here at a distal end of the manipulator 22. The movable light source 62 may for example be a laser pointer. The movable light source 62 is in signal communication with the control system 16.

FIG. 10a schematically represents a perspective view of the robot system 10c and one example of an indication operation 50c for the virtual safety border 48a using the movable light source 62. FIG. 10b schematically represents the TPU 36 displaying information associated with the indication operation 50c in FIG. 10a. As shown in FIG. 10a, the movable light source 62 irradiates a line 64a on the floor 24. In this way, the robot system 10c performs the indication operation 50c indicating the position of the virtual safety border 48a in the physical workspace 18.

FIG. 11 schematically represents a side view of the user 12 and a further example of a robot system 10d. Mainly differences with respect to the robot system 10a will be described. The robot system 10d further comprises a stationary light source 66. The stationary light source 66 is fixed in the workspace 18, here fixed to a roof structure. The stationary light source 66 may for example be a laser pointer. The stationary light source 66 is in signal communication with the control system 16.

FIG. 12a schematically represents a perspective view of the robot system 10d and one example of an indication operation 50d for the virtual safety border 48a using the stationary light source 66. FIG. 12b schematically represents the TPU 36 displaying information associated with the indication operation 50d in FIG. 12a. When the user 12 provides the selection input 52a indicating a selection of the virtual safety border 48a, the control system 16 commands the stationary light source 66 to irradiate a line 64b on the floor 24. In this way, the robot system 10d performs the indication operation 50d indicating the position of the virtual safety border 48a in the physical workspace 18.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of handling safety of an industrial robot of a robot system, the method comprising:

providing at least one virtual safety border defined in relation to the industrial robot, where each virtual safety border is associated with a condition to be fulfilled by the industrial robot;

for each virtual safety border, performing an indication operation by the robot system in a physical workspace of the industrial robot, where the indication operation indicates a position of the virtual safety border in the physical workspace of the industrial robot; and for each indication operation, receiving a verification input from a user.

2. The method according to claim 1, further comprising storing each verification input in association with the respective the virtual safety border.

3. The method according to claim 1, wherein the at least one virtual safety border includes a plurality of virtual safety borders, and wherein the method further includes simultaneously displaying the virtual safety borders on a display.

4. The method according to claim 3, wherein the virtual safety borders are visualized on the display.

5. The method according to claim 4, further comprising, for each verification input, displaying verification information in association with the virtual safety border on the display.

6. The method according to claim 4, wherein the verification input is received by means of an input device, and wherein the input device includes the display.

7. The method according to claim 3, further comprising, for each verification input, displaying verification information in association with the virtual safety border on the display.

8. The method according to claim 3, wherein the verification input is received by means of an input device, and wherein the input device includes the display.

9. The method according to claim 1, further comprising receiving a selection input from the user indicative of one of the at least one virtual safety border, and performing the indication operation for the selected virtual safety border.

10. The method according to claim 1, wherein the indication operation is performed with a laser.

11. The method according to claim 1, wherein providing the at least one virtual safety border comprises providing a plurality of virtual safety borders, and further comprising:

upon receiving a first verification input, associated with a first virtual safety border, automatically performing a second indication operation indicating a position of a second virtual safety border.

12. A control system for handling safety of an industrial robot of a robot system, the control system comprising at least one data processing device and at least one memory having at least one computer program stored thereon, the at least one computer program including a program code which, when executed by the at least one data processing device, causes the at least one data processing device to perform the steps of:

providing at least one virtual safety border defined in relation to the industrial robot, where each virtual safety border is associated with a condition to be fulfilled by the industrial robot;

for each virtual safety border, commanding performance of an indication operation by the robot system in a physical workspace of the industrial robot, where the indication operation indicates a position of the virtual safety border in the physical workspace of the industrial robot; and for each indication operation, receiving a verification input from a user.

13. The control system according to claim 12, wherein the at least one computer program includes a program code which, when executed by the at least one data processing device, causes the at least one data processing device to store each verification input in association with the respective virtual safety border.

14. The control system according to claim 12, wherein the at least one virtual safety border includes a plurality of virtual safety borders, and wherein the at least one computer program includes program code which, when executed by the at least one data processing device, causes the at least one data processing device to command simultaneous display of the virtual safety borders on a display.

15. The control system according to claim 14, wherein the virtual safety borders are visualized on the display.

16. The control system according to claim 12, wherein the at least one computer program includes a program code which, when executed by the at least one data processing device, causes the at least one data processing device to, for each verification input, command display of verification information in association with the virtual safety border on the display.

17. The control system according to claim 12, wherein the at least one computer program includes a program code which, when executed by the at least one data processing device, causes the at least one data processing device to perform the steps of receiving a selection input from the user indicative of one of the at least one virtual safety border, and commanding performance of the indication operation for the selected virtual safety border.

18. The control system according to claim 12, wherein the at least one data processing device performs the steps of:

providing a plurality of virtual safety borders, and upon receiving a first verification input, associated with a first virtual safety border, automatically performing a second indication operation indicating a position of a second virtual safety border.

19. A robot system comprising an industrial robot and a control system for handling safety of the industrial robot, the control system including at least one data processing device and at least one memory having at least one computer program stored thereon, the at least one computer program including a program code which, when executed by the at least one data processing device, causes the at least one data processing device to perform the steps of providing at least one virtual safety border defined in relation to the industrial robot, where each virtual safety border is associated with a condition to be fulfilled by the industrial robot;

for each virtual safety border, commanding performance of an indication operation by the robot system in a physical workspace of the industrial robot, where the indication operation indicates a position of the virtual safety border in the physical workspace of the industrial robot; and for each indication operation, receiving a verification input from a user.

20. The robot system according to claim 19, further comprising an input device for receiving the verification input, wherein the input device includes the display.

21. The robot system according to claim 19, wherein the at least one data processing device performs the steps of:

providing a plurality of virtual safety borders, and upon receiving a first verification input, associated with a first virtual safety border, automatically performing a second indication operation indicating a position of a
second virtual safety border.

* * * * *